United States Patent [19]

Arnold et al.

[11] 3,919,225

[45] Nov. 11, 1975

[54] PREPARATION OF N-VINYL SUBSTITUTED AMIDINES

[75] Inventors: Robert J. Arnold, Evanston; Marion J. Gattuso, Hoffman Estates, both of Ill.

[73] Assignee: Universal Oil Products Company, Des Plaines, Ill.

[22] Filed: Apr. 26, 1974

[21] Appl. No.: 464,583

[52] U.S. Cl............ 260/251 R; 260/564; 260/565; 260/309.6
[51] Int. Cl.² .................................... C07D 239/00
[58] Field of Search . 260/251 R, 564, 565, 239 BC, 260/309.6

[56] References Cited

UNITED STATES PATENTS

| 3,758,476 | 10/1973 | Rippel et al. | 260/251 R |
| 3,819,702 | 6/1974 | Lafon | 260/251 R |

*Primary Examiner*—Elbert L. Roberts
*Attorney, Agent, or Firm*—James R. Hoatson, Jr.; Raymond H. Nelson; William H. Page, II

[57] ABSTRACT

N-vinyl substituted amidines are prepared by the transvinylation reaction between an amidine and a vinyl ether in the presence of a catalyst comprising a mercury-containing compound and an acid compound.

10 Claims, No Drawings

PREPARATION OF N-VINYL SUBSTITUTED AMIDINES

BACKGROUND OF THE INVENTION

Heretofore N-vinyl substituted amidines were prepared by reacting an amidine with acetylene at elevated temperatures and pressures in the presence of vinylating catalysts such as alkali or alkaline earth metal compounds including oxides, hydroxides, alcoholates, etc., or with zinc or cadmium salts of organic acids. Inasmuch as acetylene gas is relatively dangerous to handle due to its explosive qualities, it was necessary to use relatively expensive equipment and, in addition, to undertake safety precautions to minimize the risk of an explosion. It is also known in the prior art that the transvinylation of nitrogen compounds such as non-basic materials including carbazoles which are relatively acidic or amides may be effected by treating the carbazoles or amides with a vinyl ether in the presence of a mercuric compound and an acidic catalyst. However, as hereinbefore set forth, these compounds are acid in nature. In contradistinction to this it has now been unexpectedly discovered that amidines, which are among the most highly basic organic compounds known, will undergo a transvinylation reaction when treated with a vinyl ether in the presence of a transvinylation catalyst comprising a mercury-containing compound and an acid compound to prepare N-vinyl substituted amidines. This reaction was novel in view of the catalysis art which is unexpected in nature.

This invention relates to a process for the production of N-vinyl substituted amidines. More specifically the invention is concerned with a process for the production of N-vinyl substituted amidines by means of a transvinylation reaction.

The N-vinyl substituted amidines which may be prepared according to the process of this invention will find a wide variety of uses in the chemical field. For example, a compound such as 1-vinyl-2-methyl-1,4,5,6-tetrahydropyrimidine may be used as a corrosion inhibitor, a metal deactivator or a dispersant in petroleum distillates. Other compounds such as N-vinyl-N,N'-dicyclohexylacetamidine may be used as intermediates in the preparation of other chemical compounds which may be used as inhibitors for preventing the premature sulfur vulcanization of rubber formulations, both naturally occurring and synthetic in nature.

In addition, these N-vinyl amidines may be used as intermediates in the preparation of polymers and copolymers, incorporating the amidine functionality within a polymer network. These polymers may be useful as dispersants, flocculating agents, fuel oil additives or as components for use in semipermeable membranes.

It is therefore an object of this invention to provide a process for the production of an N-vinyl substituted amidine.

A further object of this invention is to provide a transvinylation reaction for the production of an N-vinyl substituted amidine utilizing a catalytic composition of matter comprising a mercury-containing compound and an acid compound.

In one aspect an embodiment of this invention resides in a process for the preparation of an N-vinyl substituted amidine which comprises reacting an amidine having the formula:

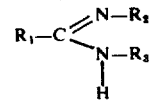

in which $R_1$ is selected from the group consisting of hydrogen, alkyl, cycloalkyl and aryl radicals and $R_2$ and $R_3$ are hydrogen, alkyl, alkenyl, cycloalkyl, aryl or together comprise an alkylene radical of from 2 to about 6 carbon atoms with a vinyl ether in the presence of a catalyst comprising a mercuric salt and an acid compound at transvinylation conditions, and recovering the resultant N-vinyl substituted amidine.

A specific embodiment of this invention is found in a process for the preparation of an N-vinyl substituted amidine which comprises reacting 2-methyl-1,4,5,6-tetrahydropyrimidine with isobutyl vinyl ether in the presence of a catalyst comprising mercuric acetate and p-toluenesulfonic acid at a temperature in the range of from about 50° to about 250° C. and a pressure in the range of from about atmospheric to about 100 atmospheres, and recovering the resultant 1-vinyl-2-methyl-1,4,5,6-tetrahydropyrimidine.

Other objects and embodiments will be found in the following further detailed description of the present invention.

As hereinbefore set forth the present invention is concerned with a novel process for the preparation of N-vinyl substituted amidines, said process consisting of a transvinylation between an amidine and a vinyl ether in the presence of a catalyst comprising a mercury-containing compound and an acid compound. The reaction is effected at transvinylation reaction conditions which include an elevated temperature in the range of from about 50° up to about 250° C. or more and a pressure in the range of from about atmospheric to about 100 atmospheres. When employing superatmospheric pressures the pressure is provided for by the introduction of a substantially inert gas such as nitrogen into the reaction zone, the amount of pressure which is utilized being that which is sufficient to maintain a major portion of the reactants in the liquid phase.

For purposes of this invention the term "amidine" which is used in the present specification and appended claims will refer to both cyclic and acyclic polynitrogen-containing compounds. These amidines will possess the generic formula:

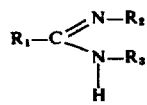

in which $R_1$ is selected from the group consisting of hydrogen, alkyl of from 1 to about 20 carbon atoms, cycloalkyl of from 3 to about 8 carbon atoms, monocyclic and polycyclic aryl radicals and $R_2$ and $R_3$ are hydrogen, alkyl of from 1 to about 20 carbon atoms, alkenyl of from 2 to about 20 carbon atoms, cycloalkyl of from 3 to about 8 carbon atoms, monocyclic or polycyclic aryl radicals or together $R_2$ and $R_3$ comprise an alkylene radical of from 2 to about 6 carbon atoms which links the two nitrogen atoms together to form a 5 to 9 membered heterocyclic ring. Some specific examples of these amidines will include N,N'-dimethylformamidine, N,N'-diethylformamidine, N,N'-dipropylformamidine, N,N'-dibutylformamidine, N,N'-dipentylformamidine, N,N'-dihexylformamidine, N,N'-diheptylformamidine, N,N'-dinonylformamidine, N,N'-didecylformamidine, N,N'-didodecylformamidine, N,N'-dihexadecylformamidine, N,N'-dieicosylformamidine, N,N'-propenylformamidine, N,N'-dibutenylformamidine, N,N'-dioctenylformamidine, N,N'-diundecenylformamidine, N,N'-oleylformamidine, N,N'-dicyclopropylformamidine, N,N'-dicyclobutylformamidine, N,N'-dicyclopentylformamidine, N,N'-dicyclohexylformamidine, N,N'-dicycloheptylformamidine, N,N'-dicyclooctylformamidine, N,N'-diphenylformamidine, N,N'-di-p-tolylformamidine, N,N'-dibenzylformamidine, N,N'-dinaphthylformamidine, N,N'-dimethylacetamidine, N,N'-dipropylacetamidine, N,N'-dipentylacetamidine, N,N'-diheptylacetamidine, N,N'-didecylacetamidine, N,N'-dihexadecylacetamidine, N,N'-diheptenylacetamidine, N,N'-didodecenylacetamidine, N,N'-dicyclopropylacetamidine, N,N'-dicyclopentylacetamidine, N,N'-dicycloheptylacetamidine, N,N'-diphenylacetamidine, N,N'-dibenzylacetamidine, N,N'-diethylpropioamidine, N,N'-dibutylpropioamidine, N,N'-dihexylpropioamidine, N,N'-dinonylpropioamidine, N,N'-didodecylpropioamidine, N,N'-dieicosylpropioamidine, N,N'-dihexenylpropioamidine, N,N'-ditetradecenylpropioamidine, N,N'-dieicosenylpropioamidine, N,N'-dicyclobutylpropioamidine, N,N'-dicyclohexylpropioamidine, N,N'-dicyclooctylpropioamidine, N,N'-di-p-tolylpropioamidine, N,N'-dinaphthylpropioamidine, N,N'-dimethylbutyramidine, N,N'-dipropylbutyramidine, N,N'-dipentylbutyr amidine, N,N'-diheptylbutyramidine, N,N'-didecylbutyramidine, N,N'-dihexadecylbutyramidine, N,N'-dioctenylbutyramidine, N,N'-dipentadecenylbutyramidine, N,N'-dicyclopropylbutyramidine, N,N'-dicyclopentylbutyramidine, N,N'-dicycloheptylbutyramidine, N,N'-diphenylbutyramidine, N,N'-dibenzylbutyramidine, 2-methyl-1,4,5,6-tetrahydropyrimidine, 2-ethyl-1,4,5,6-tetrahydropyrimidine, 2-propyl-1,4,5,6-tetrahydropyrimidine, 2-nonyl-1,4,5,6-tetrahydropyrimidine, 2-decyl-1,4,5,6-tetrahydropyrimidine, 2-dodecyl-1,4,5,6-tetrahydropyrimidine, 2-tetradecyl-1,4,5,6-tetrahydropyrimidine, 2-pentadecyl-1,4,5,6-tetrahydropyrimidine, 2-methylimidazoline, 2-ethylimidazoline, 2-propylimidazoline, 2-octadecylimidazoline, 2-cyclopropylimidazoline, 2-cyclobutylimidazoline, 2-cyclopentylimidazoline, 2-cyclohexylimidazoline, 2-cyclooctylimidazoline, etc. It is to be understood that the aforementioned amidines are only representative of the class of compounds which may be used as starting materials in the present invention and that said invention is not necessarily limited thereto.

The aforementioned amidines are, as hereinbefore set forth, subjected to a transvinylation reaction by treatment with a vinyl ether which will possess the formula:

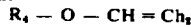
R₄ — O — CH = CH₂ in which $R_4$ is an alkyl of from 1 to about 6 carbon atoms or an aryl radical, specific examples of these vinyl ethers being methyl vinyl ether, ethyl n-propyl vinyl ether, isopropyl vinyl ether, n-butyl vinyl ether, isobutyl vinyl ether, pentyl vinyl ether, hexyl vinyl ether, phenyl vinyl ether, benzyl vinyl ether, o-tolyl vinyl ether, m-tolyl vinyl ether, p-tolyl vinyl ether, etc. It is to be understood that the aforementioned vinyl ethers are only representative of the class of compounds which may be used as starting materials in the transvinylation reaction of the present invention and that said invention is not necessarily limited thereto.

The transvinylation process of the present invention is effected in the presence of a transvinylation catalyst, said catalyst comprising a mixture of a mercury-containing compound and an acid compound. The mercury-containing compound may be classified as a salt and for purposes of this invention mercuric oxide is included in the term mercuric salt. Other mercuric salts which may be employed are preferably those salts of organic acids such as mercuric formate, mercuric acetate, mercuric propionate, mercuric butyrate, mercuric pentanoate, etc. The acid compound which makes up the other components of the transvinylation catalyst will comprise either a mineral acid or an organic acid, examples of these acids including hydrochloric acid, nitric acid, sulfuric acid, phosphoric acid, methanesulfonic acid, ethanesulfonic acid, benzenesulfonic acid, p-toluenesulfonic acid, etc. In addition, if so desired, the reaction may also be effected in the presence of a substantially inert organic solvent, although the presence of said solvent is not necessary for the operation of the process. Some examples of these solvents which may be employed will include paraffinic hydrocarbons such as n-pentane, n-hexane, n-heptane, etc.; cycloparaffinic hydrocarbons such as cyclopentane, cyclohexane, methyocyclopentane, etc.; or aromatic hydrocarbons such as benzene, toluene, the xylenes, ethylbenzene, etc. The vinyl ether will usually be present in the reaction mixture in an excess over the amidine, such excess being in a range of from about 2:1 up to about 5:1 moles of ether per mole of amidine.

The process of this invention may be effected in any suitable manner and may comprise either a batch or continuous type operation. For example when a batch type operation is used, a quantity of the amidine and the vinyl ether of the types hereinbefore set forth in greater detail are placed in an appropriate apparatus. When the reaction is to be effected at atmospheric pressure this apparatus may comprise a flask which is provided with heating, stirring and refluxing means. The transvinylation catalyst comprising the mercury-containing compound such as the mercuric salt and the acid compound are also placed in the apparatus which is thereafter heated to the desired operating temperature. In the preferred embodiment of the invention, this operating temperature will be the reflux temperature, usually of the ether reactant. After maintaining the temperature for a predetermined residence time which may range from about 0.5 up to about 20 hours or more in duration, heating is discontinued and the apparatus is allowed to return to room temperature. The catalyst is then quenched by the addition of a basic compound such as sodium hydroxide, potassium hydroxide, lithium hydroxide, sodium carbonate, potassium carbonate, lithium carbonate, etc., and the reaction mixture is then subjected to separation means such as fractional distillation, usually under reduced pressure, whereby the desired N-vinyl substituted amidine may be separated and recovered.

It is also contemplated within the scope of this invention that the transvinylation reaction of the present invention may be effected in a continuous manner of operation. When such a type of operation is employed, the starting materials comprising the amidine and the vinyl ether are continuously charged to a reaction zone which is maintained at the proper operating conditions of temperature and pressure. The transvinylation catalyst comprising the mercuric salt and the acid compound is also charged to the reactor and after a predetermined time, the reactor effluent is continuously withdrawn and subjected to conventional means of separation whereby the desired N-vinyl substituted amidine is recovered while any unreacted starting materials as well as transvinylation catalyst are recycled to the reaction zone to form a portion of the feed stock. The two components of the reaction mixture may be charged to the reactor through separate lines or, if so desired, they may be admixed prior to entry into said reactor and charged thereto in a single stream.

Examples of N-vinyl substituted amidines which may be prepared according to the process of this invention will include those having the generic formula:

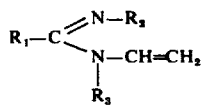

in which $R_1$ is selected from the group consisting of hydrogen, alkyl of from 1 to about 20 carbon atoms, cycloalkyl of from 3 to about 8 carbon atoms, monocyclic and polycyclic aryl radicals, and $R_2$ and $R_3$ are selected from the group consisting of hydrogen, alkyl of from 1 to about 20 carbon atoms, alkenyl of from 2 to about 20 carbon atoms, cycloaklyl of from 3 to about 8 carbon atoms, monocyclic and polycyclic aryl radicals, or together $R_2$ and $R_3$ comprise an alkylene radical of from 2 to about 6 carbon atoms which links the 2 nitrogen atoms together to form a 5 to 9 membered heterocyclic ring. Some specific examples of these compounds will include N-vinyl-N,N'-dimethylformamidine, N-vinyl-N,N'-diethylformamidine, N-vinyl-N,N'-dipropylformamidine, N-vinly-N,N'-dihexylformamidine, N-vinyl-N,N'-didecylformamidine, N-vinyl-N,N'-dioctadecylformamidine, N-vinyl-N,N'-dihexenylformamidine, N-vinyl-N,N'-diundecenylformamidine, N-vinyl-N,N'-didecylformamidine, N-vinyl-N,N'-diphenylformamidine, N-vinyl-N,N'-dicyclohexylformamidine, N-vinyl-N,N'-di-p-tolylformamidine, N-vinyl-N,N'-dimethylacetamidine, N-vinyl-N,N'-diethylacetamidine, N-vinyl-N,N'-dipropylacetamidine, N-vinyl-N,N'-dihexylacetamidine, N-vinyl-N,N'-didecylacetamidine, N-vinyl-N,N'-dioctadecylacetamidine, N-vinyl-N,N'-dinonenylacetamidine, N-vinyl-N,N' -dieicosenylacetamidine, N-vinyl-N,N'-diphenylacetamidine, N-vinyl-N,N'-dicyclohexylacetamidine, N-vinyl-N,N'-di-p-tolylacetamidine, N-vinyl-N,N'-dimethylpropioamidine, N-vinyl-N,N'-diethylpropioamidine, N-vinyl-N,N'-dipropylpropioamidine, N-vinyl-N,N'-dihexylpropioamidine, N-vinyl-N,N'-didecylpropioamidine, N-vinyl-N,N'-dioctadecylpropioamidine, N-vinyl-N,N'-didecenylpropioamidine, N-vinyl-N,N'-diheptadecenylpropioamidine, N-vinyl-N,N'-diphenylpropioamidine, N-vinyl-N,N'-dicyclohexylpropioamidine, N-vinyl-N,N'-di-p-tolylpropioamidine, 1-vinyl-1,4,5,6-tetrahydropyrimidine, 1-vinyl-1,4,5-trihydroimidazole, 1-vinyl-2-methyl-1,4,5,6-tetrahydropyrimidine, 1-vinyl-2-ethyl-1,4,5,6-tetrahydropyrimidine, 1-vinyl-2-propyl-1,4,5,6-tetrahydropyrimidine, 1-vinyl-2-octadecyl-1,4,5,6-tetrahydropyrimidine, 1-vinyl-2-cyclohexyl-1,4,5,6-tetrahydropyrimidine, 1-vinyl-2-phenyl-1,4,5,6-tetrahydropyrimidine, etc. It is to be understood that these compounds are only representative of the class of N-vinyl substituted amidines which may be prepared and that the present invention is not necesarily limited thereto.

The following examples are given to illustrate the process of the present invention which, however, are not intended to limit the generally broad scope of the present invention in strict accordance therewith.

EXAMPLE I

To illustrate the necessity for a dual catalyst, 400 grams (4.0 mole) of isobutyl vinyl ether and 98 grams (1.0 mole) of 2-methyl-1,4,5,6-tetrahydropyrimidine were admixed and the solution was heated to the reflux temperature of the isobutyl vinyl ether for a period of 1 hour. Analysis of the mixture indicated that no reaction had occurred. At this time, 3.2 grams (0.01 mole) of mercuric acetate was added and the solution was again refluxed for an additional period of 1 hour. Analysis again showed that little reaction had occurred. Thereafter 1.0 gram of p-toluenesulfonic acid which had been dissolved in 10 grams of tetrahydrofuran was added and the mixture was refluxed for a period of 15 hours, 1.6 grams of mercuric acetate being added in two separate occasions to insure the proper amount of the catalyst. At the end of the 15-hour period, heating was discontinued and 10 grams of sodium carbonate was added to deactivate the catalyst. The reaction mixture was then subjected to fractional distillation under reduced pressure and the cuts boiling in a range of from 105°–110° C. at 30 mm. of mercury pressure were recovered. These cuts comprised 1-vinyl-2-methyl-1,4,5,6-tetrahydropyrimidine.

EXAMPLE II

The above experiment was repeated using lesser amounts of the reactants, 9.8 grams (0.1 mole) of 2-methyl-1,4,5,6-tetrahydropyrimidine being dissolved in 40.0 grams (0.4 mole) of isobutyl vinyl ether. To the resulting solution was then added 0.32 grams (0.01 mole) of mercuric acetate and 0.01 grams of p-toluenesulfonic acid monohydrate which had been dissolved in 1 gram of tetrahydrofuran. The resulting suspension was then stirred and heated to reflux temperature (about 85° C.) for a period of 18 hours. At the end of this time, an additional amount of mercury salts comprising 0.1 gram of mercuric acetate was added and the reaction mixture again refluxed for an additional 6 hours. At the end of the total of 24 hours, the catalyst was quenched by the addition of 1.0 gram of sodium carbonate and the mixture was subjected to fractional distillation under reduced pressure. The cut boiling at 95°–98° C. at a pressure of 18–20 mm. of mercury was recovered and subjected to analysis with the following results:

Calculated for: $C_7H_{12}N_2$: C, 67.70%; H, 9.74%; N, 22.56%. Found: C, 65.11%; H, 9.87%; N, 20.62%. These cuts comprised the desired product, namely, 1-vinyl-2-methyl-1,4,5,6-tetrahydropyrimidine.

EXAMPLE III

To a flask provided with heating, stirring and refluxing means is added 33.6 grams (0.1 mole) of 2-octadecyl-1,4,5,6-tetrahydropyrimidine which is dissolved in 50.0 grams (0.5 mole) of isobutyl vinyl ether. Thereafter 0.32 grams (0.01 mole) of mercuric acetate and 0.01 grams of p-toluenesulfonic acid which is dissolved in 1 gram of tetrahydrofuran is added to the solution.

The solution is then stirred and heated to reflux temperature (about 85° C.) for a period of 18 hours. During the 18-hour residence time an additional amount of mercuric acetate is added to the solution in two increments of 0.1 gram each. At the end of the 18-hour period, heating is discontinued and the solution is subjected to fractional distillation under reduced pressure, the desired product comprising 1-vinyl-2-octadecyl-1,4,5,6-tetrahydropyrimidine being recovered therefrom.

EXAMPLE IV

In this example 57.2 grams (0.1 mole) of N,N'-dioleylformamidine is dissolved in 43 grams (0.5 mole) of isopropyl vinyl ether. To the resulting solution is added 2.16 grams (0.01 mole) of mercuric oxide and 0.01 grams of methanesulfonic acid. The resulting suspension is then stirred and heated to reflux temperature for a period of 20 hours. During the 20-hour period, an additional amount of mercury oxide is added twice to the solution. AT the end of the 40-hour period, the resulting mixture is subjected to fractional distillation under reduced pressure whereby the desired product comprising N-vinyl-N,N'-dioleylformamidine is separated out and recovered.

EXAMPLE V

To 36 grams (0.5 mole) of ethyl vinyl ether is added 19.6 grams (0.1 mole) of N,N'-diphenylformamidine, the formamidine being dissolved in the ether. Thereafter 0.32 grams (0.01 mole) of mercuric acetate and 0.1 grams of sulfuric acid is added to the solution. The suspension is then stirred and heated to reflux temperature for a period of 14 hours. During the 14 hours an additional 0.2 grams of mercuric acetate are added in 2 equal incremental portions. At the end of the 14-hour time period, heating is discontinued, the mixture is recovered andd subjected to fractional distillation under reduced pressure whereby the desired product comprising N-vinyl-N,N'-diphenylformamidine is separated out.

EXAMPLE VI

To 40.0 grams (0.4 mole) of isobutyl vinyl ether is added 22.3 grams (0.1 mole) of N,N'-dicyclohexylacetamidine. After the acetamidine is dissolved in the ether, there is added thereto 2.16 grams (0.01 mole) of mercuric oxide and 0.01 grams of p-toluenesulfonic acid monohydrate which is dissolved in 1 gram of tetrahydrofuran. The resulting suspension is then stirred and heated to reflux temperature (about 85° C.) for a period of 24 hours, during which time an additional amount of mercury oxide amounting to 0.2 grams is added in 2 equal incremental portions. At the end of the 24-hour period, the heating is discontinued, the reaction mixture is recovered and subjected to fractional distillation under reduced pressure whereby the desired product comprising N-vinyl-N,N'-dicyclohexylacetamidine is recovered.

We claim as our invention:

1. A process for the preparation of an N-vinyl substituted amidine which comprises reacting an amidine having the formula:

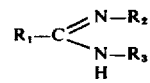

in which $R_1$ is selected from the group consisting of hydrogen, alkyl, cycloalkyl and aryl radicals and $R_2$ and $R_3$ are hydrogen, alkyl, alkenyl, cycloalkyl, aryl or together comprise an alkylene radical of from 2 to about 6 carbon atoms with a vinyl ether of the formula:

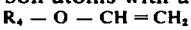

in which $R_4$ is alkyl of from 1 to about 6 carbon atoms or aryl, in the presence of a catalyst comprising a mercury compound selected from the group consisting of mercuric oxide, formate, acetate, propionate, butyrate and pentanoate and an acid selected from the group consisting of hydrochloric acid, nitric acid, sulfuric acid, phosphoric acid, methanesulfonic acid, ethanesulfonic acid, benzenesulfonic acid and p-toluenesulfonic acid, at a temperature of from about 50° to about 250°C. and a pressure of from about atmospheric to about 100 atmospheres, and recovering the resultant N-vinyl substituted amidine.

2. The process of claim 1 in which $R_4$ is an alkyl of from 1 to about 6 carbon atoms.

3. The process of claim 1 in which said catalyst comprises mercuric acetate and p-toluenesulfonic acid.

4. The process of claim 1 in which said catalyst comprises mercuric oxide and methanesulfonic acid.

5. The process of claim 1 in which said catalyst comprises mercuric acetate and sulfuric acid.

6. The process of claim 1 in which said amidine is 2-methyl-1,4,5,6-tetrahydropyrimidine, said vinyl ether is isobutyl vinyl ether, and said N-vinyl substituted amidine is 1-vinyl-2-methyl-1,4,5,6-tetrahydropyrimidine.

7. The process of claim 1 in which said amidine is 2-octadecyl-1,4,5,6-tetrahydropyrimidine, said vinyl ether is isobutyl vinyl ether, and said N-vinyl substituted amidine is 1-vinyl-2-octadecyl-1,4,5,6-tetrahydropyrimidine.

8. The process of claim 1 in which said amidine is N,N'-dioleylformamidine, said vinyl ether is isopropyl vinyl ether and said N-vinyl substituted amidine is N-vinyl-N,N'-dioleylformamidine.

9. The process of claim 1 in which said amidine is N,N'-diphenylformamidine, said vinyl ether is ethyl vinyl ether, and said N-vinyl substituted amidine is N-vinyl-N,N'-diphenylformamidine.

10. The process of claim 1 in which said amidine is N,N'-dicyclohexylacetamidine, said vinyl ether is isobutyl vinyl ether, and said N-vinyl substituted amidine is N-vinyl-N,N'-dicyclohexylacetamidine.

* * * * *